United States Patent [19]

Arthur

[11] Patent Number: 5,258,203
[45] Date of Patent: Nov. 2, 1993

[54] PROCESS FOR THE MANUFACTURE OF THIN FILM COMPOSITE MEMBRANES

[75] Inventor: Samuel D. Arthur, Wilmington, Del.

[73] Assignee: E. I. Du Pont de Nemours and Company, Wilmington, Del.

[21] Appl. No.: 650,257

[22] Filed: Feb. 4, 1991

[51] Int. Cl.$^5$ .......................... B05D 3/10; B05D 5/00
[52] U.S. Cl. ............... 427/245; 210/500.38; 427/340; 427/341
[58] Field of Search .......... 427/244, 245, 246, 340, 427/341; 210/500.37, 500.38, 500.27

[56] References Cited

U.S. PATENT DOCUMENTS

| | | | |
|---|---|---|---|
| 4,005,012 | 1/1977 | Wrasidlo | 210/23 H |
| 4,259,183 | 3/1981 | Cadotte | 210/654 |
| 4,360,434 | 11/1982 | Kawaguchi et al. | 210/500.2 |
| 4,559,139 | 12/1985 | Uemura et al. | 427/245 X |
| 4,606,943 | 8/1986 | Rak et al. | 427/244 |
| 4,659,475 | 4/1987 | Liao et al. | 427/244 X |
| 4,737,325 | 4/1988 | Kamiyama et al. | 264/45.1 |
| 4,761,234 | 8/1988 | Uemura et al. | 210/500.38 |
| 4,828,708 | 5/1989 | Bray | 210/654 |

OTHER PUBLICATIONS

Noller, C. R., "Chemistry of Organic Compounds," 3rd edition, Philadelphia, W. B. Saunders Company, 1965, pp. 991–992.
Mason, J. P. et al., "The Technology of Plastics and Resins," New York, D. Van Nostrand Company, Inc., 1945, p. 7.

*Primary Examiner*—Evan Lawrence

[57] ABSTRACT

The disclosed invention is directed to the manufacture of high-flux, thin-film, composite reverse osmosis membranes by use of cyclohexane or aliphatic hydrocarbon solvents such as hexane with selected solvent additives. This avoids the use of chlorofluorocarbon-based solvents.

7 Claims, No Drawings

PROCESS FOR THE MANUFACTURE OF THIN FILM COMPOSITE MEMBRANES

FIELD OF THE INVENTION

The disclosed invention is directed to manufacture of reverse osmosis membranes. In particular, the disclosed invention relates to manufacture of reverse osmosis membranes by a process that avoids the use of chlorinated fluorocarbon solvents.

BACKGROUND OF THE INVENTION

Reverse osmosis (RO) membranes are semipermeable barriers which, when pressurized on one side with a solution such as aqueous solution of sodium chloride (NaCl), allow preferential passage of the solvent (water) to separate solvent from the solute (NaCl). The important operating characteristics of an RO membrane are salt rejection, that is, the degree to which the dissolved salt is separated from the solvent, and flux, that is, the amount of solvent that permeates the membrane in a given time at a given pressure.

Thin-film composite RO polyamide membranes are typically made by interfacial polymerization. This is carried out by immersing a microporous polymeric substrate in an aqueous diamine followed by immersion in a solution of a polyacyl halide in an organic solvent. The organic solvent typically is chosen based on its ability to dissolve the polyacyl halide to a useful concentration while not interfering with the polyamidation reaction and not damaging the microporous substrate membrane. The solvent of choice has been 1,1,2-trichlorotrifluoroethane (FREON®TF), also referred to herein, generically, as CFC-113. CFC-113, however, is expensive and, being a chlorofluorocarbon (CFC), has been cited as potentially causing undesirable environmental effects.

The use of additives in organic solvents is described in U.S. Pat. No. 4,761,234. In that patent, the additive is N,N-dimethylformamide and the solvent is CFC-113. The additive functions as a catalyst for the polyamidation reaction.

Hexane as well as other aliphatic hydrocarbons, such as heptane and naphtha, are free of the potential environmental concerns associated with CFC solvents. These hydrocarbons also are known to be useful solvents for interfacial polyamidation. See, for example, U.S. Pat. Nos. 4,005,012; 4,259,183; 4,360,434; 4,606,943; 4,737,325; and 4,828,708. However, the membranes produced by interfacial polyamidation with hexane as the reaction solvent typically have lower flux than membranes produced with CFC-113. The use of hexane as a reaction solvent, therefore, has not gained wide commercial acceptance.

If one could substitute aliphatic hydrocarbons such as hexane for CFC solvents in the manufacture of thin-film composite RO membranes and still manufacture membranes with flux levels comparable to those attained with CFC solvents, the process would be less expensive and environmentally advantageous. The process of this invention meets that objective.

SUMMARY OF THE INVENTION

The disclosed invention is directed to manufacture of high-flux, thin-film composite RO membranes by use of a solvent system comprising aliphatic hydrocarbon solvents, such as hexane, and selected additives. The solvent system surprisingly allows production of RO membranes with salt rejection and flux comparable to membranes produced with the CFC solvents of the prior art.

Although many of the additives of this invention are solvents or swelling agents for substrates such as the polysulfone typically used, use of the additives in aliphatic-hydrocarbon-based solvents surprisingly does not damage the polysulfone substrate on which the polyamide is formed.

In accordance with the invention, a solvent system useful in manufacture of thin-film, semi-permeable membranes by interfacial polymerization of reactants is provided. The solvent system comprises an aliphatic hydrocarbon and an additive that increases the polarity of the hydrocarbon solvent while not interfering with interfacial polymerization of the reactants.

The invention is directed to a method for manufacture of semi-permeable membranes by interfacial polymerization of reactants on a polymeric substrate. The method comprises treating the substrate with a solution of a first reactant for providing the membrane and further treating the substrate with a solution that includes an aliphatic hydrocarbon, at least one additional reactant for polymerizing with the first reactant for providing the membrane, and an additive that increases the polarity of the hydrocarbon solvent while not interfering with interfacial polymerization of the reactants.

Having briefly summarized the invention, the invention will now be described in detail by reference to the following specification and non-limiting examples. Unless otherwise specified, all percentages and parts are by weight and all temperatures are in degrees Celsius.

DETAILED DESCRIPTION OF THE INVENTION

Generally, the membranes of the invention are manufactured by interfacial polymerization of a first reactant with a second reactant on a porous polymeric substrate. The first reactant is provided in the form of an aqueous solution. The second reactant is provided in the form of a solution comprising the second reactant in a solvent system comprising cyclohexane or an aliphatic hydrocarbon solvent and a soluble organic additive that increases the polarity of the solvent but which does not interfere with interfacial polymerization of reactants or damage the substrate. Although the present invention is useful for the manufacture of semi-permeable membranes generally, the invention is particularly suited to manufacture of semi-permeable, polyamide membranes.

Semi-permeable, polyamide membranes are made by treating a porous polymeric substrate with a first reactant comprising an aqueous solution of diamine and then treating the diamine-treated substrate with a solution of a second reactant comprising an polyacyl halide reactant in a solvent system of an aliphatic hydrocarbon solvent and a suitable additive. Aqueous solutions of diamines suitable for use in the invention most preferably are m-phenylenediamine and p-phenylenediamine. Other useful diamines include xylylenediamine, piperazine, and the like.

Various polyacyl halides capable of participating in an interfacial polymerization may be used. Examples of polyacyl halides include aryl polyacyl halides as well as aliphatic polyacyl halides. Suitable aryl polyacyl halides include, but are not limited to, trimesoyl chloride, isophthaloyl chloride, and the like, preferably trimesoyl chloride. Useful aliphatic polyacyl halides include, but are not limited to, 1,3,5-cyclohexanetricarbonyl chloride, tetrahydrofuran-1,2,3,4-tetracarbonyl chloride and the like, preferably 1,3,5-cyclohexanetricarbonyl chloride. The amount of polyacyl halide is generally from 0.01 to 5.0 wt. %, preferably 0.05 to 0.25%.

Aliphatic hydrocarbons suitable for use in the invention are selected on the basis of the following criteria: 1) it has the ability to dissolve the polyacyl halide to a useful concentration, preferably 0.1 to 1.0%; 2) it does not interfere with polymerization reaction by reacting or chemically combining with the diamines or polyacyl halides; and 3) it does not damage the microporous substrate used. Accordingly, useful aliphatic hydrocarbons include, but are not limited to hexane, heptane, naphtha, octane and the like. Cyclohexane is also useful. Hexane and cyclohexane are preferred. Most preferred is hexane.

Additives useful in this invention are selected base on the following criteria: 1) their non-reactivity with the diamines and polyacyl halides; 2) their having a polarity greater than that of the aliphatic hydrocarbon in the solvent system so that the polarity of the solvent system is increased over that of the aliphatic hydrocarbon solvent alone; 3) their being soluble in the aliphatic hydrocarbon; 4) they do not damage the porous polymeric substrate at the concentrations employed; and 5) the ease of their removal from the membrane after formation. Since removal of the additives typically would be by washing with water or evaporation, the additives should either have at least partial solubility in water or be sufficiently volatile so that they evaporate at ambient or slightly elevated temperatures at a reasonable rate. They should have a normal boiling point of less than 200° C., preferably less than 150° C. Useful concentrations of additives may be 1–25%, preferably 5–10%, of the solvent system.

Additives that are useful in the invention include but are not limited to organic compounds that contain oxygen, carbon-carbon double bonds, halogens or other heteroatoms. Useful additives containing oxygen include, but are not limited to, ethers such as diethyl ether, methyl t-butylether, tetrahydrofuran, dioxane and the like; ketones such as, but not limited to, acetone, methylisobutylketone, 2-butanone and the like; esters such as, but not limited to, methyl acetate, ethyl formate, ethyl acetate and the like; and nitro compounds such as nitroethane, nitromethane and the like. Useful additives containing halogens include, but are not limited to, 1,1,1-trichloroethane, dichloromethane, and the like; halogenated alkenes such as trichloroethylene, dichloroethylene and the like; halogenated aromatics such as chlorobenzene, fluorobenzene and the like. Useful additives containing carbon-carbon double bonds include, but are not limited to, aromatic hydrocarbons, non-aromatic unsaturated hydrocarbons, heteroaromatics, and the like. Aromatic hydrocarbons include, but are not limited to, benzene, toluene, florobenzene, chlorobenzene, and the like. Non-aromatic unsaturated hydrocarbons include, but are not limited to, cyclohexene, heptene and the like. Heteroaromatics include, but are not limited to, furan and the like.

Polymeric substrates suitable for use in the invention include, but are not limited to, polysulfone, polyethersulfone, cellulose, cellulose esters, polyvinyl chloride, polyamide, polyimide and the like. These substrates are manufactured by processes well known in that art. Examples of these processes are illustrated in U.S. Pat. Nos. 4,277,344; 4,451,414; 4,629,563 and 4,824,568, the disclosures of which are incorporated by reference.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

A microporous polysulfone substrate is prepared by knife-casting a 16% solution of UDEL®P3500 polyethersulfone (Union Carbide Corporation) in N,N-dimethylformamide (DMF) containing 0.3% water onto a support of polyester sailcloth. The solution is cast at a knife clearance of 5.5 mil. The sailcloth bearing the cast polyethersulfone solution is immersed in a water bath within two seconds of casting to produce a microporous polysulfone substrate. The substrate is extracted with water to remove DMF and is stored damp until use.

The microporous polysulfone substrate is immersed in a 2% aqueous solution of metaphenylenediamine (MPD) for 5 minutes. The wet substrate is drained briefly and then excess MPD solution droplets are removed by placing the substrate, polysulfone up, on a paper towel and rolling the substrate with a soft rubber roller. The damp MPD-impregnated substrate is then immersed for 20 seconds in a solution of 0.16 w/v % 1,3,5-cyclohexanetricarbonyl chloride (CHTC) in 9:1 (v/v) hexane/ethyl ether to form the polyamide membrane via interfacial polymerization. The membrane is allowed to dry in air for 2 minutes and is then extracted with 50° C. running tap water for 10 minutes. The membrane is allowed to stand in 15% aqueous ethanol for 2 hours and is then kept in deionized water until testing.

The resulting membrane is evaluated for flux and salt rejection by placing the membrane in a cross-flow reverse osmosis permeation cell (e.g., Model 5369 RO Cell, Gassner Inc, Portland, Oreg. 97219) and subjecting the membrane to a feed of 0.25% aqueous sodium chloride at pH 6.5–7.0 and 25° C. The membrane is exposed to a feed pressure of 420 psig for 14 hours after which the feed pressure is lowered to 225 psig and the permeation properties are determined.

The performance of the membrane is characterized in terms of the percent of dissolved salt NaCl rejected (R) and permeability (Kw). The percent salt rejection R is defined as $$R = [1 - (C_p/C_f)] \times 100\%$$

where $C_p$ and $C_f$ are the concentrations of NaCl in the permeate and feed, respectively. These concentrations can be determined conductimetrically such as with a Beckman G1 conductivity cell and a YSI Model 34 conductivity meter.

The permeability (Kw) is defined as flux/effective pressure, where flux is the flow rate of water through the membrane and the effective pressure is equal to the feed pressure minus the opposing osmotic pressure of the feed solution. Permeability is expressed in terms of meters/second/teraPascal (m/s/Pa×10$^{-12}$), m/s/TPa. A Kw of 7 is equal to about 20 gallons per square foot of membrane per day (GFD) at 225 psig at a feed concentration of 0.25% NaCl. Feed conversion, that is, the volume of permeate per unit time divided by the volume of feed per unit time, it typically below 2%.

Salt rejection flux values are shown in Table 1.

EXAMPLES 2-9

Samples of microporous polysulfone substrate of Example 1 are impregnated with 2% aqueous MPD and are rolled with a soft rubber roller as above in Example 1. The substrates are then immersed for 20 seconds in solutions of 0.16 w/v % 1,3,5-cyclohexanetricarbonyl chloride (CHTC) in hexane containing the indicated amounts of various additives to form the polyamide membranes via interfacial polymerization. The membranes are tested after extraction as above; the results are shown in Table 1.

TABLE 1

| Example # | Additive, % in Hexane | NaCl Rejection | Kw (m/s/TPa) |
|---|---|---|---|
| 1 | ethyl ether, 5% | 98.16% | 8.93 |
| 2 | nitroethane, 5% | 96.62% | 9.20 |
| 3 | methylisobutylketone, 5% | 96.06% | 14.16 |
| 4 | toluene, 5% | 98.46% | 6.58 |
| 5 | ethyl ether, 5% | 97.62% | 7.08 |
| 6 | trichloroethane, 5% | 97.58% | 7.85 |
| 7 | trichloroethane, 10% | 96.17% | 8.57 |
| 8 | methyl-t-butyl ether, 5% | 96.47% | 8.13 |
| 9 | methyl-t-butyl ether, 10% | 98.10% | 9.12 |

COMPARATIVE EXAMPLE 1

The microporous polysulfone substrate of Example 1 is immersed in a 2% aqueous solution of metaphenylenediamine (MPD) for 5 minutes. The wet substrate is drained briefly and then excess MPD solution droplets are removed by placing the substrate, polysulfone up, on a paper towel and rolling the substrate with a soft rubber roller. The damp MPD-impregnated substrate is then immersed for 20 seconds in a solution of 0.16 w/v % 1,3,5-cyclohexanetricarbonyl chloride (CHTC) in FREON®TF (1,1,2-trichlorotrifluoroethane) to form the polyamide membrane via interfacial polymerization. The membrane is allowed to dry in air for 2 minutes and is then extracted with 50° C. running tap water for 10 minutes. The membrane is allowed to stand in 15% aqueous ethanol for 2 hours and is then kept in deionized water until testing, the results of which are shown in Table 2.

COMPARATIVE EXAMPLE 2

The microporous polysulfone substrate of Example 1 is impregnated with 2% aqueous MPD and is rolled with a soft rubber roller as above. The substrate is then immersed for 20 seconds in a solution of 0.16 w/v % 1,3,5-cyclohexanetricarbonyl chloride (CHTC) in hexane to form the polyamide membrane via interfacial polymerization. The membrane is tested after extraction as above; the results are shown in Table 2.

TABLE 2

| | CHTC/MPD Controls | | |
|---|---|---|---|
| Comparative Example | Reaction Solvent | Salt Rejection | Kw (m/s/TPa) |
| 1 | FREON ® TF | 97.51% | 9.07 |
| 2 | hexane | 97.36% | 6.35 |

EXAMPLES 10-12

Samples of microporous polysulfone substrate of Example 1 are impregnated with 2% aqueous MPD and are rolled with a soft rubber roller as above. The substrates then are immersed for 40 seconds in solutions of 0.05 w/v % 5-isocyanatoisophthaloyl chloride (ICIC) in hexane containing the indicated amounts of various additives to form the polyamide membranes via interfacial polymerization. The membranes are tested after extraction in warm water; the results are shown in Table 3.

TABLE 3

| Example No. | Additive, % in Hexane | NaCl Rejection | Kw (m/s/TPa) |
|---|---|---|---|
| 10 | 5% methyl t-butyl ether | 98.71% | 6.88 |
| 11 | 5% ethyl ether | 99.06% | 5.96 |
| 12 | 3% methylisobutyl ketone | 98.31% | 8.68 |

COMPARATIVE EXAMPLES 3 AND 4

Samples of microporous polysulfone substrate of Example 1 are impregnated with 2% aqueous MPD and are rolled with a soft rubber roller as above. The substrates are then immersed for 40 seconds in solutions of 0.05 w/v % 5-isocyanatoisophthaloyl chloride (ICIC) in pure FREON®TF or pure hexane to form the polyamide membranes via interfacial polymerization. The results of testing membranes after extraction in warm water shown in Table 4.

TABLE 4

| | ICIC/MPD Controls | | |
|---|---|---|---|
| Comparative Example | Reaction Solvent | Salt Rejection | Kw (m/s/TPa) |
| 3 | FREON ® TF | 99.33% | 8.66 |
| 4 | hexane | 99.18% | 5.69 |

EXAMPLES 13 AND 14

Samples of microporous polysulfone substrate of Example 1 are impregnated with 2% aqueous MPD and are rolled with a soft rubber roller as above. The substrates are then immersed for 30 seconds in solutions of 0.10 w/v % trimesoyl chloride (TMC) in hexane containing the indicated amounts of additives to form the polyamide membranes via interfacial polymerization. The membranes are tested after extraction in warm water; the results are shown in Table 5.

TABLE 5

| Example # | Additive, % in Hexane | NaCl Rejection | Kw (m/s/TPa) |
|---|---|---|---|
| 13 | 5% methyl-t-butyl ether | 98.86% | 7.94 |
| 14 | 5% ethyl ether | 99.41% | 7.46 |

COMPARATIVE EXAMPLES 5 AND 6

Samples of microporous polysulfone substrate of Example 1 are impregnated with 2% aqueous MPD and are rolled with a soft rubber roller as above. The substrates are then immersed for 40 seconds in solutions of 0.10 w/v % trimesoyl chloride (TMC) in pure FREON®TF or pure hexane to form the polyamide membranes via interfacial polymerization. The membranes are tested after extraction in warm water; the results are shown in Table 6.

TABLE 6

| Comparative Example | Reaction Solvent | Salt Rejection | Kw (m/s/TPa) |
|---|---|---|---|
| 5 | FREON ® TF | 99.74% | 5.24 |
| 6 | hexane | 99.59% | 3.76 |

From the foregoing description, one skilled in the art can easily ascertain the essential characteristics of this invention, and without departing from the spirit and scope thereof, can make various changes and modifications of the invention to adapt it to various usages and conditions.

I claim:

1. A method for manufacture of semi-permeable membranes by interfacial polymerization of reactants on a polymeric microporous substrate comprising:
   a. treating said substrate with a solution of a first reactant for providing said membrane, and
   b. further treating said substrate with a solution of cyclohexane or an aliphatic hydrocarbon, at least one additional reactant for polymerizing with said first reactant and an organic additive, said organic additive being selected from the group consisting of benzene, toluene, xylene, heptene, cyclohexene, dimethyl ether, diethyl ether, methyl t-butylether, furan, tetrahydrofuran, dioxane, acetone, 2-butanone, methylisobutylketone, nitromethane, nitroethane, methyl acetate, ethyl acetate, ethyl formate, dichloromethane, 1,1,1-trichloroethane, dichloroethylene, trichloroethylene, fluorobenzene, and chlorobenzene, and said additive being present in an amount of from 1 to 25 weight percent of the solvent system comprising the additive and cyclohexane or said aliphatic hydrocarbon.

2. The method of claim 1 wherein said organic additive is present in an amount of 5 to 10 weight percent of the solvent system.

3. The method of claim 1 wherein said organic additive is diethyl ether.

4. The method of claim 1 wherein said organic additive is methyl t-butylether.

5. The method of claim 1 wherein said aliphatic hydrocarbon is selected from the group consisting of hexane, heptane, naphtha and octane.

6. The method of claim 5 wherein said aliphatic hydrocarbon is hexane.

7. The method of claim 1 wherein said first reactant is metaphenylenediamine and said additional reactant is trimesoyl chloride.

* * * * *